Patented Dec. 18, 1951

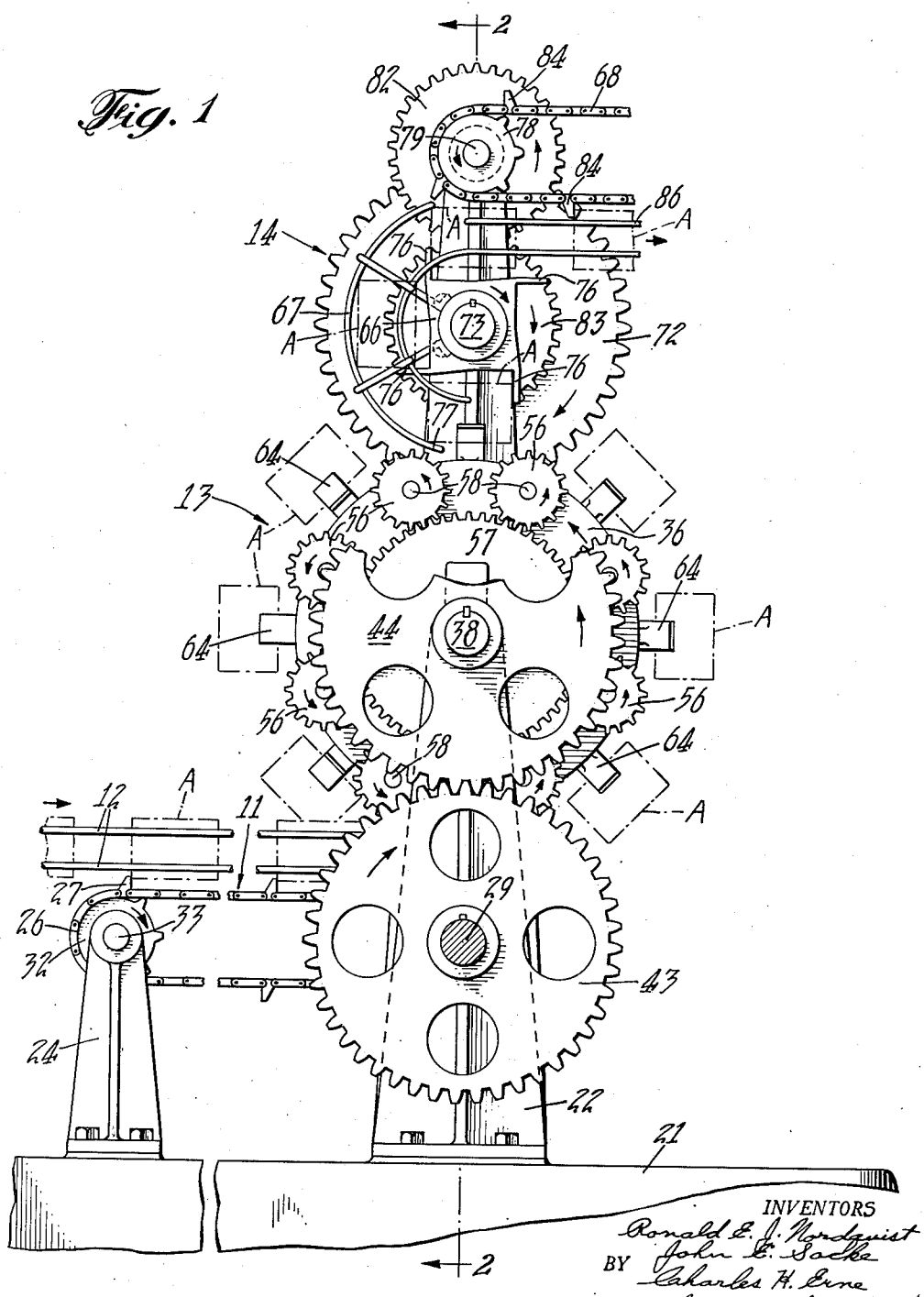

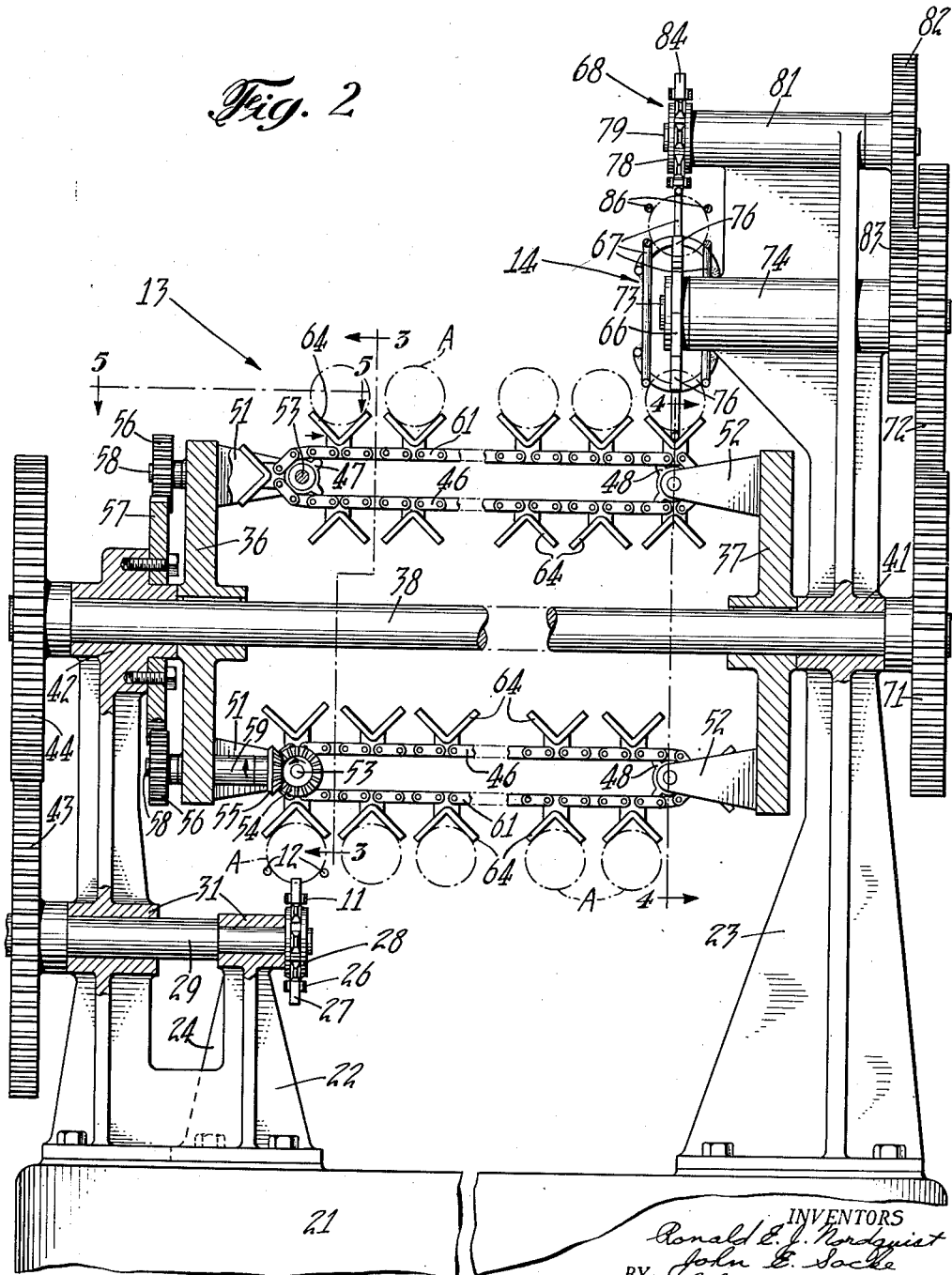

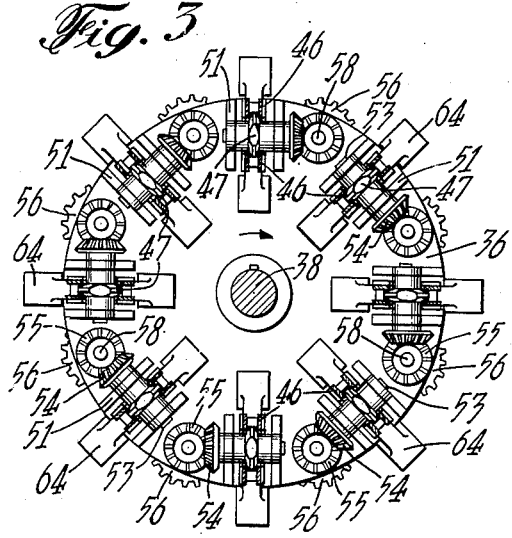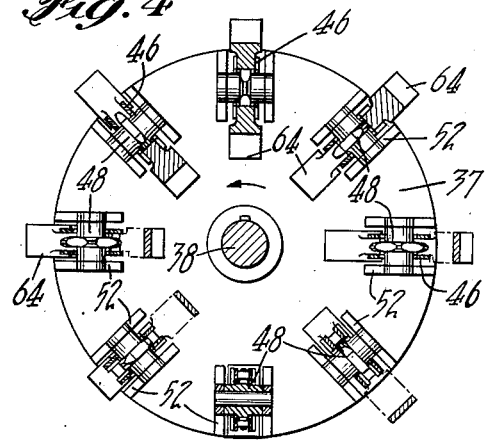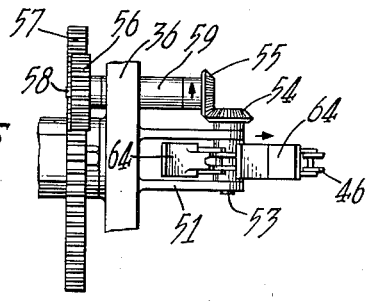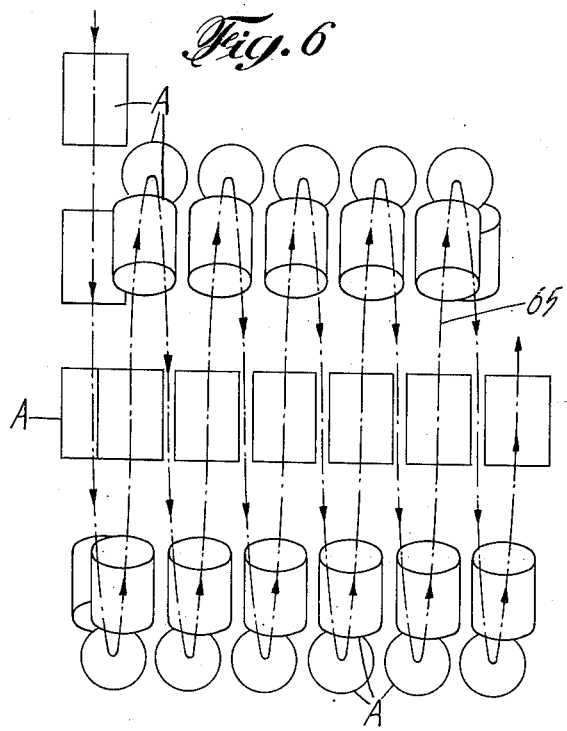

2,578,733

UNITED STATES PATENT OFFICE 2,578,733

ARTICLE CONVEYING MACHINE

Ronald E. J. Nordquist, Maplewood, N. J., and John E. Socke, Pelham Manor, N. Y., assignors to American Can Company, New York, N. Y., a corporation of New Jersey Application March 21, 1949, Serial No. 82,664

6 Claims. (Cl. 198—41)

This invention relates generally to article conveying machines and more particularly to machines adapted to conveying tubular articles such as can bodies through a treating medium subsequent to a manufacturing operation in which the bodies are heated, such as a side seam soldering operation.

In continuous line processing or treating of articles, steps such as heating, cooling, drying, etc. frequently require much time and therefore considerable floor space is required for the apparatus necessary to accommodate the continuously moving articles during the extended period in which their temperature or other treatment is changed between prescribed limits.

A typical use of the present invention is in the process of can body making wherein the tubular bodies are heated during a side seam soldering operation, and then cooled before further mechanical operations are performed upon them. To convey these bodies in a straight line during this cooling period would require an extensive area of valuable floor space, but the conveying machine of the present invention, when used for this purpose, requires only a small fraction of the same floor space.

It is therefore an object of the instant invention to provide a compact and efficient conveying machine of structural novel in the art for receiving articles, holding them in predetermined positions on a conveyor, moving them in a helical path through a temperature changing or other treating medium, and discharging the articles from the machine.

Another object of the invention is the provision of such an article conveying machine wherein the articles are simultaneously conveyed in a plurality of directions in the same overall space the combined movement of said articles resulting in their movement through a maximum path of travel within a minimum space.

Another object of the instant invention is the provision of such a machine wherein articles such as can bodies having freshly soldered side seams to be cooled are picked up by the machine and carried therethrough gently and smoothly so as to prevent disturbance of the solder films on the side seams.

Numerous other objects and advantages of the invention will be apparent as it is better understood from the following description, which, taken in connection with the accompanying drawings, discloses a preferred embodiment thereof.

Referring to the drawings:

Figure 1 is a side elevation of the machine with parts broken away to facilitate illustration;

Fig. 2 is a vertical section of the machine taken along the line 2—2 in Fig. 1; with parts broken away;

Fig. 3 is a vertical section taken substantially along the broken line 3—3 in Fig. 2;

Fig. 4 is a vertical section taken substantially along the line 4—4 in Fig. 2;

Fig. 5 is a fragmentary plan view taken substantially along a plane indicated by the line 5—5 in Fig. 2; and Fig. 6 is a schematic diagram illustrating a helical movement of a can body as it is conveyed from one end of the machine to the other.

The drawings illustrate a preferred or exemplary embodiment of the invention in which tubular sheet metal can bodies A heated during a preceding soldering operation, are advanced by a feed-in conveyor 11 (Fig. 1), along and between guide bars 12 to a rotating cooling drum indicated generally by the numeral 13. The bodies, immersed in a cooling medium such as air as they are moved from one end of the drum to the other, are then removed from the drum and conveyed from the machine by discharge mechanism indicated generally by the numeral 14.

These elements of the machine are mounted in a frame which comprises a base 21 (Figs. 1 and 2), a drive standard 22, a transfer and discharge standard 23 and a sprocket bracket 24, all securely bolted together to form a unitary frame.

The feed-in conveyor 11, which may be a continuation of another machine such as a side seam soldering machine, comprises an endless chain 26 provided with spaced feed dogs 27 which engage behind and advance the heated cans along the guide bars 12 to one end of the cooling drum 13 the axis of which in the present embodiment is positioned at right angles to the path of travel of the conveyor 11. The endless chain 26 is driven by a drive sprocket 28 (Fig. 2) mounted on and keyed to a drive shaft 29 journaled in a pair of spaced bearings 31 formed in the standard 22. The drive shaft is rotated in any suitable manner. The remote end of the conveyor chain 26 takes over an idler sprocket 32 mounted on a shaft 33 journaled in a bearing formed in the sprocket bracket 24.

Can bodies, heated, for example, by a preceding soldering operation, are delivered to the spaced feed dogs 27 on the endless chain 26 and are advanced by the dogs along the guide bars 12 to the end of the drum 13 nearest to the feed-in conveyor 11.

Drum 13 comprises two axially spaced disc-shaped end members 36 and 37 keyed to a horizontal shaft 38 which is journaled in a bearing 41 in discharge standard 23 and in a bearing 42 in drive standard 22. The drum and horizontal shaft are rotated by power transmitted from the drive shaft 29 through a gear 43 which is keyed to the drive shaft and a meshing gear 44 which is keyed to the shaft 38.

Between the end members 36 and 37 of the drum, a plurality of cross conveyors 46 operate over on a series of drive sprockets 47 (Figs. 2, 3 and 4) and idler sprockets 48 mounted respectively for rotation in brackets 51 and 52 formed integrally with the end members 36 and 37, respectively.

Each drive sprocket 47 is keyed to a short shaft 53 journaled in one of the brackets 51, and both shaft and sprocket are rotated through a gear train comprising a pair of bevel gears 54, 55 (see also Fig. 5), a pinion 56 and a stationary gear 57. Bevel gear 54 is keyed to the shaft 53 and meshes with bevel gear 55 keyed to one extremity of a shaft 58. This shaft is journaled in a bearing 59 formed in the end member 36. Each of the pinions 56 is keyed to the outer end of the shaft 58 and meshes with the stationary gear 57 which is bolted to the bearing 42 of the drive standard 22 as shown in Fig. 2.

As the drum 13 is rotated by means of the gears 43, 44, each of the pinions 56 is revolved around the drum axis and is also rotated on its own axis by virtue of its meshing engagement with the stationary gear 57. The sprockets 47 driven through the gear train described above are rotated in a direction so that an outer run 61 of each conveyor 46 moves longitudinally of the drum from left to right as viewed in Fig. 2. The drawings show this conveyor movement to be substantially parallel to the horizontal shaft 38 but the invention contemplates longitudinal movement of this conveyor which need not be parallel to the drum axis.

The general outer formation of the drum 13 shown in the drawings is cylindrical, the outer runs 61 of the cross conveyors being disposed substantially parallel to the drum axis. However, the runs 61 may be disposed angularly relative to the drum axis and the resulting generally frusto-conical drum formation would produce like results.

Furthermore, the invention also contemplates a similar drum disposed in a vertical instead of the horizontal position shown in the drawings. Or the drum may be disposed at some angular position between said horizontal and vertical positions. Slight modifications essential to making any such change in the angular disposition of the drum will be obvious to those skilled in the art.

The can bodies A or other articles to be carried by the drum 13 are retained in carriers 64 mounted in predetermined spaced relation on the chains 61.

Each cross conveyor 46 is provided with a series of spaced carriers 64 (Figs. 1, 2 and 5). Each carrier is a magnet, preferably a permanent magnet, and is formed as a V-shaped trough with its axis disposed transversely of the path of the conveyor so as to receive and to carry a can body A longitudinally of the drum, as the conveyor 46 operates.

As a carrier 64 at the lower end of the drum (see Fig. 2) approaches the feed-in conveyor 11, a can body A is fed by the conveyor in timed relation and in a direction substantially tangential to the carrier movement. The body is thus advanced by a propelling feed dog 27 into fully seated position in the carrier 64 where it is retained by magnetic attraction and the angular formation of the carrier trough throughout further movement on the drum.

Movement of each body longitudinally of the drum by the cross conveyors 46 is supplemented by rotary movement imparted to it by rotation of the drum about its axis. The resulting path 65 of each can is therefore helical as shown diagrammatically in Fig. 6 of the drawings.

Where the conveyor runs 61 are disposed angularly relative to the drum axis as hereinbefore mentioned the articles move in a conical helix or spiral path instead of in a cylindrical helix as illustrated. As used in this specification and claims herein, the term "helical" is therefore intended to indicate or refer to both of these paths—the cylindrical or the conical helix—unless one or the other is clearly indicated.

Figs. 1, 2 and 6, show that the bodies A are fed substantially tangentially to the path 65 of the bodies in carriers 64 on the drum 13. This assures a smooth, gentle handling of the freshly soldered bodies and prevents disturbance of the solder films on the side seams of the bodies.

Transference of the bodies A from the carriers 64 to discharge mechanism 14 at the opposite end of the drum is also tangential to the body path on the drum. This discharge mechanism comprises a transfer star wheel 66 (Figs. 1 and 2), guide bars 67 and a discharge conveyor 68. The mechanism is driven from the horizontal shaft 38 through a gear 71 keyed to the shaft 38 and meshing with a gear 72 keyed to a transfer shaft 73. Shaft 73 is journaled in a bearing 74 formed in the discharge standard 23 and the star wheel 66 is fixed to the inner end of this shaft as shown in Fig. 2.

Each of a plurality of arms 76 formed at the periphery of star wheel 66 engages a can body fed to it by a carrier 64 on a cross conveyor 46 and, in cooperation with end portions 77 of the guide bars 67, the arm strips the body from the magnetic attraction and mechanical positioning of its carrier. The arm then continues to advance the body along the guide bars 67 to the discharge conveyor 68. This conveyor is driven by a sprocket 78 which is keyed to a shaft 79 journaled in a bearing 81 at the upper end of the discharge standard 23. Shaft 79 is also keyed to a gear 82 which is driven by a meshing gear 83 keyed to the transfer shaft 73. The movement of each can body by the arm 76 is timed so that one of a plurality of spaced dogs 84 on the discharge conveyor engages the rear edge of the body and advances it along a straight portion 86 of the guide bars 67 to any suitable place of deposit.

Briefly summarizing the operation of the above described embodiment of the invention: heated can bodies A are fed by the conveyor 11 tangentially into a plurality of magnetic carriers 64 of the drum 13, the drum being rotated on its axis while the carriers are translated longitudinally of the drum to effect a resultant movement of the bodies along a helical path at the periphery of the drum.

The lapsed time in which each body is moved through its complete helical path may be varied in accordance with the desired temperature gradient for the cooling operation. To vary the cooling time it is necessary merely to increase or decrease the spacing between the end members 36 and 37 of the drum with a consequent increase or decrease in the length of the cross conveyors 46 and also in cooling time.

While the drawings show a machine adapted to cooling by air, it is obvious to those versed in this art that other media may be used with incidental changes of structure to adapt the present invention to use with such media.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an article conveying machine, the combination of a rotatable drum, a continuous conveyor mounted in said drum and movable longitudinally of said drum, a plurality of article carriers on said continuous conveyor, each carrier having means for attracting, seating and for holding an article in the carrier, means for rotating said drum to carry said conveyor and said carriers in a circular path, and means connected with said drum rotating means for simultaneously actuating said conveyor to move said carriers and their held articles longitudinally of the drum, the combination of said rotary movement of the drum and said longitudinal movement of the continuous conveyor resulting in the movement of said article in a helical path.

2. In an article conveying machine, the combination of a rotatable drum, a continuous conveyor in the periphery of said drum and disposed longitudinally thereof, carriers on said conveyor for temporarily holding said articles in spaced relation and in a predetermined position on said conveyor, means for continuously rotating said drum and for continuously actuating said continuous conveyor longitudinally of said rotating drum, the combined rotary movement of said drum and longitudinal movement of said conveyor resulting in the movement of each article held in its carrier through a helical path from one end of said drum to the other, a feed in device for advancing articles tangentially of said helical path and into said path adjacent one end of said drum, stripping and guiding means adjacent the other end of said drum, and a discharge device cooperating with said stripping and guiding means for removing said articles tangentially from said helical path and for conveying them from the machine.

3. In a treating machine for tubular articles, the combination of a rotatable drum immersed in a temperature changing medium, a cross conveyor mounted in and operable longitudinally of said drum, carriers in said conveyor said carriers having means for temporarily holding said tubular articles at spaced intervals on said conveyor with the longitudinal axes of said carriers and the longitudinal axes of the tubular articles held thereby disposed at substantially right angles to the axis of said drum, means for continuously rotating said drum, and means for continuously actuating said conveyor longitudinally of said rotating drum, the combination of said rotary movement of the drum and longitudinal movement of the conveyor resulting in movement of said tubular articles along a helical path with the axis of each article disposed substantially tangentially to said helical path.

4. In a treating machine for tubular articles, the combination of a machine frame, a drum rotatably mounted in said frame and immersed in a treating medium, axially spaced end members in said drum, cross conveyors carried by said drum and extending between and having shafts journaled in said end members, carriers transversely disposed and fixed to said conveyors said carriers having means for retaining said tubular articles on said conveyors in a predetermined position, means for continuously rotating said drum in said frame, a stationary gear secured to said frame adjacent a said end member of said drum, a plurality of conveyor actuating gear trains mounted in said end member adjacent said stationary gear, each of said gear trains having connection with a cross conveyor shaft and meshing with said stationary gear and moving its associated conveyor longitudinally of said drum during rotation thereof, the combination of said rotary movement of said drum and longitudinal movement of each of said conveyors resulting in movement of each tubular article along a helical path with the axis of each article disposed substantially tangentially to said helical path.

5. In a metallic can body cooling machine, the combination of a rotatable drum immersed in a cooling medium, a plurality of continuous conveyors in the periphery of said drum and disposed longitudinally thereof, a plurality of spaced magnetic carriers on said conveyors for holding metallic can bodies on said conveyors, means for rotating said drum, and means for actuating said continuous conveyor longitudinally of said drum, the combined rotary movement of said drum and longitudinal movement of said conveyors resulting in movement of each of said bodies in a helical path throughout the length of said drum.

6. A metallic can body cooling machine of the character described in claim 5 in which said carriers are also V-shaped troughs, having their axes transversely disposed relative to said conveyor, to retain said can bodies in said carriers with their axes disposed substantially tangentially of said helical path of the bodies.

RONALD E. J. NORDQUIST.
JOHN E. SOCKE.

REFERENCES CITED

The following references are of record in the file of this patent:

UNITED STATES PATENTS

| Number | Name | Date |
|---|---|---|
| 680,037 | Gilli | Aug. 6, 1901 |
| 1,153,177 | Keast | Sept. 7, 1915 |
| 1,977,526 | Piscetta | Oct. 16, 1934 |
| 1,983,471 | Kramer | Dec. 4, 1934 |